United States Patent
Houle et al.

(10) Patent No.: US 9,890,959 B2
(45) Date of Patent: Feb. 13, 2018

(54) UNIVERSAL TILE INSTALLATION MAT FOR UNCOUPLING FLOOR OR WALL TILES SET IN MORTAR FROM A SUPPORT SURFACE

(71) Applicants: Robert Houle, Beaconsfield (CA); Gregory Gelston, Kirkland (CA); Guy Jean Houle, Blainville (CA)

(72) Inventors: Robert Houle, Beaconsfield (CA); Gregory Gelston, Kirkland (CA); Guy Jean Houle, Blainville (CA)

(73) Assignee: 10148849 CANADA INC., Beaconsfield, QC (CA)

(*) Notice: Subject to any disclaimer, the term of this patent is extended or adjusted under 35 U.S.C. 154(b) by 0 days.

(21) Appl. No.: 14/999,866

(22) Filed: Jul. 13, 2016

(65) Prior Publication Data

US 2018/0017269 A1 Jan. 18, 2018

(51) Int. Cl.
| | |
|---|---|
| E04C 2/52 | (2006.01) |
| F24D 13/02 | (2006.01) |
| E04B 5/48 | (2006.01) |
| E04F 15/10 | (2006.01) |
| E04F 15/024 | (2006.01) |

(52) U.S. Cl.
CPC ............... *F24D 13/02* (2013.01); *E04B 5/48* (2013.01); *E04F 15/02452* (2013.01); *E04F 15/107* (2013.01)

(58) Field of Classification Search
CPC .. F24D 13/02; E04F 15/02452; E04F 15/107; E04B 5/48
See application file for complete search history.

(56) References Cited

U.S. PATENT DOCUMENTS

| | | |
|---|---|---|
| 2,956,785 A | 10/1960 | Riehl |
| 4,318,258 A | 3/1982 | Heck |
| 4,326,366 A | 4/1982 | Werner |
| 5,042,569 A | 8/1991 | Siegmund |
| 6,094,878 A | 8/2000 | Schluter |
| 6,434,901 B1 | 8/2002 | Schluter |
| 7,250,570 B1 | 7/2007 | Morand |
| D654,600 S | 2/2012 | Devine |
| 8,176,694 B2 | 5/2012 | Batori |

(Continued)

FOREIGN PATENT DOCUMENTS

CA 2872103 5/2015

*Primary Examiner* — Patrick J Maestri
(74) *Attorney, Agent, or Firm* — Houle Patent Agency Inc.

(57) ABSTRACT

A universal tile installation mat is described for use in the construction of tiled floors and walls and wherein the mat is secured on a sub-floor surface formed of wood or concrete or a wall surface. The tile installation mat uncouples the mortar and the tiles set therein and disposed over the mat to prevent cracking of the mortar, the tiles and the grouted joints due to displacements in the support surfaces. The tile installation mat is formed from flexible plastics materials and has three different types of support formations integrally formed therein to anchor mortar and to retain heating wires captive in different patterns as desired to form a heated tiled floor or wall. The support formations facilitates ease of installation of heated wires and provides counter acting forces against a heating wire from escaping from anchoring passages formed by the support formations.

22 Claims, 8 Drawing Sheets

(56) References Cited

U.S. PATENT DOCUMENTS

| | | | |
|---|---|---|---|
| 8,950,141 B2 * | 2/2015 | Schluter | E04F 15/182 |
| | | | 52/385 |
| 9,188,348 B2 | 11/2015 | Larson | |
| 9,328,520 B1 | 5/2016 | Kriser | |
| 9,416,979 B2 | 8/2016 | Larson | |
| 9,518,746 B2 | 12/2016 | Larson | |
| 9,625,163 B2 * | 4/2017 | Larson | F24D 13/02 |
| 2002/0136543 A1 * | 9/2002 | Thorin | F24D 3/141 |
| | | | 392/435 |
| 2008/0017725 A1 | 1/2008 | Backman | |
| 2008/0290504 A1 * | 11/2008 | Karavakis | H01L 23/3737 |
| | | | 257/713 |
| 2009/0026192 A1 * | 1/2009 | Fuhrman | H05B 3/06 |
| | | | 219/523 |
| 2009/0230113 A1 | 9/2009 | Batori | |
| 2011/0047907 A1 | 3/2011 | Smolka | |
| 2014/0097169 A1 | 4/2014 | Charron | |
| 2015/0144708 A1 | 5/2015 | Slanik | |

* cited by examiner

UNIVERSAL TILE INSTALLATION MAT FOR UNCOUPLING FLOOR OR WALL TILES SET IN MORTAR FROM A SUPPORT SURFACE

TECHNICAL FIELD

The present invention relates to a universal tile installation mat for use in a tile installation system for uncoupling floor or wall tiles set in mortar from a sub-floor or wall surface and which tile installation system can also be used to attach heating wires in desired patterns to heat the tiles.

Underlayments are known to uncouple mortar in which floor or wall tiles are set from a sub-floor or wall support surface whereby any movement in the sub-floor or wall is not transmitted into the mortar and tiles set therein causing fissures to form in the mortar and transmitted to the joints and/or tiles causing the tiles to cracks-thereby necessitating costly repairs. They also provide waterproofing and drainage and act as a vapor barrier. Different and thicker underlayments have been developed to attach electrical heating wires to formations formed in the top surface of the underlayment and to also uncouple the mortar from the sub-floor or wall to prevent the same problems as well as preventing short circuits in the wiring. If a break is formed in the wiring which is set in mortar, it must first be located by the use of special devices and then it is necessary to break the tiles and mortar to repair the wire breakage. This requires skilled workmanship and is an expensive repair.

Some known underlayments and other form of connectors are adapted to support and connect to electrical heating wiring by post-like formations which define projecting flexible flanges or protrusions formed in opposed support post formations to define a channel there between wherein a wire passing therein is retained in the channel by the opposed projecting flanges. Usually, these formations are identical and extend on the top face of the underlayment in transverse rows or single row strips. Reference is made to U.S. Pat. Nos. 8,950,141 and 7,250,570 as examples of these.

Several other patents also exist in the prior art relating to various types of underlayments with attachments for connecting electrical heating wires, or piping adapted to circulate a heated liquid, are known. Various types of formations are also disclosed for the attachment of electrical heating wires and some formation layouts can become confusing to the installers due to their complicated patterns. Further, some proposed post attachment designs can cause the wire runs to detach due to inadequate retention of the wire(s) or complicated pattern runs. Such detachments are often caused by tradesmen walking on the underlayment with the wires installed, prior to the application of the thin set mortar and tiles.

It is common in the trade to use a different underlayment when electrical heating wires are required. The use of two different underlayment products adds to production cost and to the cost of having to support in inventory, both to the manufacturer, distributor and the trades person.

It would therefore be advantageous to have a single underlayment product which can be used to construct heated or non-heated floor or wall surfaces. With heated floor surfaces it is also advantageous to provide an underlayment with support attaching formations which make it easy to install electrical heating wires, in various patterns with straight runs, while providing adequate wire retention and the availability of different spacing between wire runs. The installation and connection of the wires should be made simply by sliding the finger over the wire with the wire being guided by some of the formations in retention areas.

It is also desirable to provide adequate support formations with mortar anchoring means wherein the thin set mortar is easily channeled in undercut regions of some of the formations to assure proper retention of the mortar with the upper surface area of the underlayment.

SUMMARY OF THE INVENTION

It is a feature of the present invention to provide a universal tile installation mat which provides the desired results and features mentioned herein above.

It is a further feature of the present invention to provide a universal tile installation mat which can be used as a decoupling strata between a floor or wall surface, formed of various materials, and tiles set in a mortar base.

A further feature of the present invention is to provide a universal tile installation mat which reduces costs of fabrication, transport and inventory as compared to the use of two different underlayments which produce different functions.

Another feature of the present invention is to provide a tile installation mat with wire connecting and guiding formations which facilitates the installation of wires in a variety of different patterns while providing a secured attachment of the wires within the surface of the tile installation mat.

A still further feature of the present invention is to provide a tile installation mat with wire retention means wherein alternate wire retention means are disposed on respective sides of a wire retained on the mat to exert opposed retention force on a wire connected within the tile installation mat to prevent accidental displacement of the wire.

According to the above features, from a broad aspect, the present invention provides a universal tile installation mat for use on a sub-floor or wall surface to anchor mortar adapted to receive in support engagement floor or wall tiles and wherein the mat uncouples the mortar and the floor or wall tiles set therein from the sub-floor or wall surface. The mat is comprised of a flexible base sheet, having integrally formed, a plurality of elevated support formations projecting outwardly from a flat outer surface of the base sheet and terminating in a flat top surface lying in a common flat plane substantially parallel to the flat outer surface of the base sheet. The support formations are disposed in a repeat pattern throughout the base sheet. Some of the support formations are circular mortar anchoring formations each defining an open top end cavity in their flat top surface and which have at least a portion of an inner side wall of the cavity sloping downwardly and inwards under the flat top surface from the flat top wall to a base wall of the open top end cavity. The circular mortar anchoring formations further define a circumferential protruding top edge. Some of the elevated formations are guide posts disposed on opposed transverse sides of the circular mortar anchoring formations and spaced there from a predetermined common distance to define an anchoring passage between a straight vertical side wall of the guide posts and a bottom outer wall portion of the circular mortar anchoring formations. Other of the elevated support formations are circular anchoring posts disposed and spaced a predetermined common distance between end edges of opposed associated ones of four of the guide posts.

According to a still further broad aspect of the present invention the anchoring passages are one of a mortar anchoring passage and/or heating wire anchoring passages.

DESCRIPTION OF THE DRAWINGS

A preferred embodiment of the present invention will now be described with reference to the accompanying drawings in which:

FIG. 5 is an enlarged view showing part of the mortar anchoring formation formed in the base sheet and the design of the elongated rectangular shaped guide post disposed adjacent the mortar anchoring formation to form an anchoring passage there between;

DESCRIPTION OF THE PREFERRED EMBODIMENT

Figure 1:
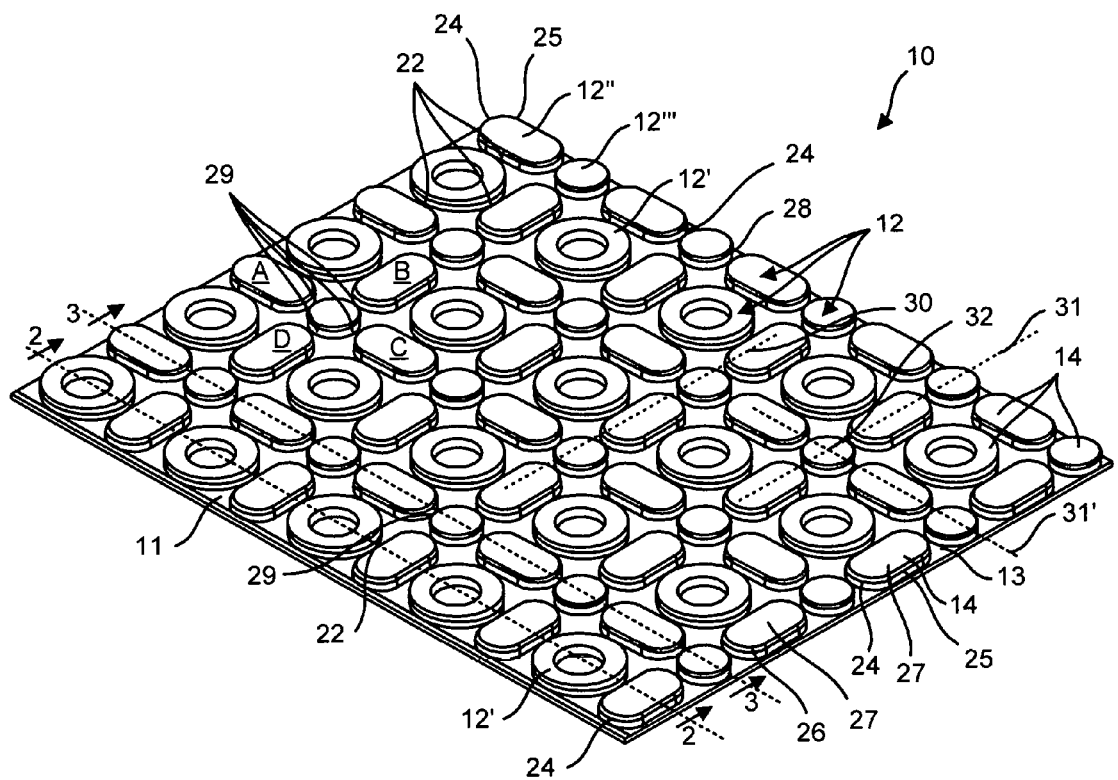
FIG. 1 is a perspective top view of the universal tile installation mat of the present invention illustrating the different elevated support formations and the distribution pattern of the formations throughout the mat.

Referring now to the drawings, and more particularly to FIGS. 1 to 5, there is shown generally at 10 in FIG. 1 the universal tile installation mat of the present invention. It is comprised by a base sheet 11 formed of a suitable flexible plastics material, such as for example polyethylene, polypropylene or other flexible material capable of maintaining its shape after molding. As herein shown the tile installation mat is formed with a plurality of elevated support formations 12 projecting outwardly from a flat upper surface 13 of the base sheet 11. All of the support formations define a flat top surface 14 which lie in a common flat plane 15 which is substantially parallel to the flat upper surface 13 of the base sheet. There are three types of support formations 12 and these are disposed in a specific pattern, as shown in FIG. 1, which repeats throughout the mat. The tile installation mat has a thickness of about 5 millimeters as calculated from an under face of the base sheet 11 to the top surface of the formations. The structure of the support formations 12 and their function with respect to one another follows.

Figure 2:
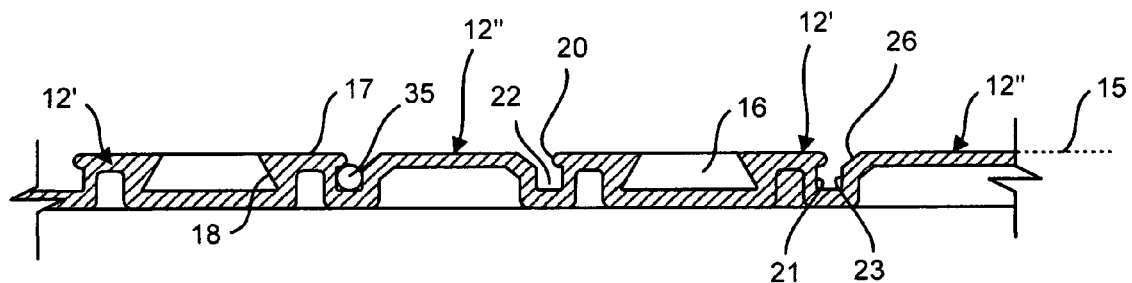
FIG. 2 is an enlarged cross-section view along cross-section line 2-2 of FIG. 1.
Figure 5:
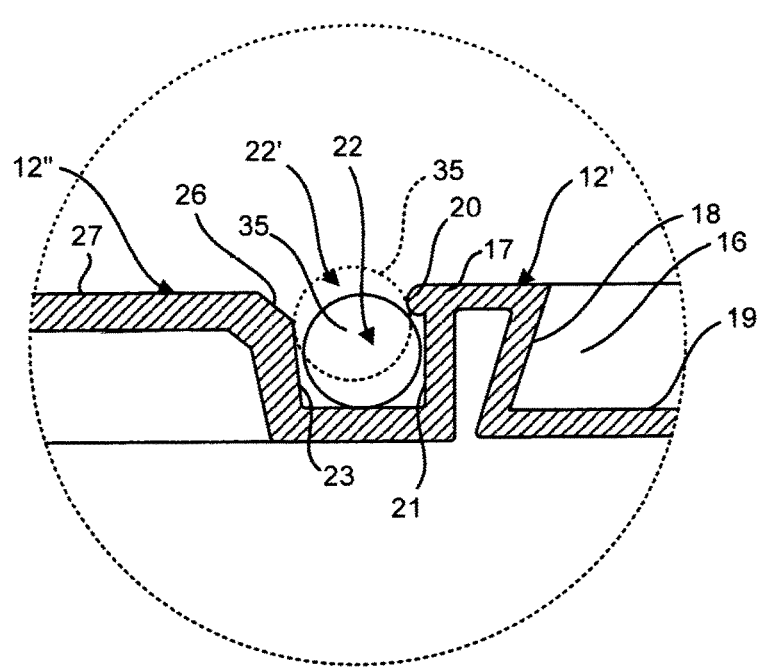
Figure 7:
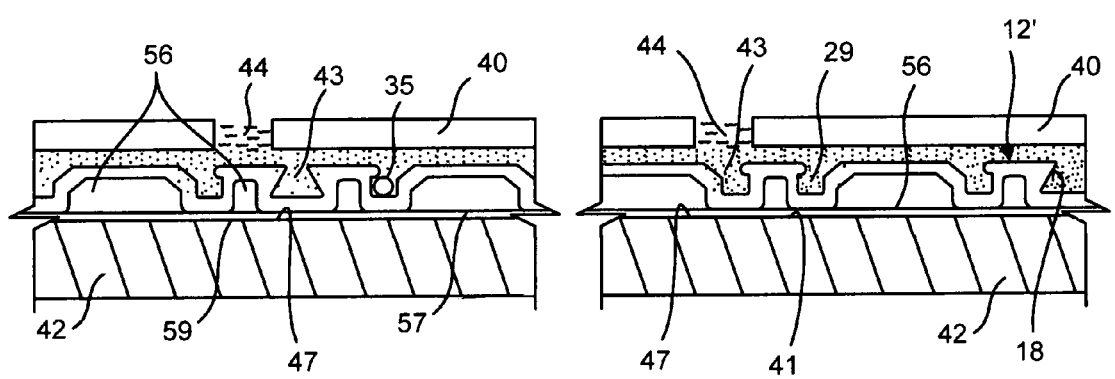
FIG. 7 is a fragmented cross-section view showing the tile installation mat in use wherein ceramic or natural stones tiles have been set on a layer of mortar anchored in the various cavities formed on the flat upper surface of the mat base sheet herein connected to a plywood sheet subfloor by glue.

As shown more clearly in FIGS. 2 and 5, the support formation 12' is a circular anchoring formation which is provided with an open top end cavity 16 in its flat top wall 17 whereby to anchor mortar therein, as illustrated in FIG. 7. The open top end cavity has an inner side wall 18 which slopes downwardly and inwards at an angle of about 80 degrees from the top wall 17 and terminates at a base wall 19 of the cavity. The circular anchoring formation 12' also defines a circumferential protruding outer top edge forming a lip 20 projecting beyond a straight vertical outer wall 21 thereof for a purpose which will be described below. As herein shown the lip is of bead shape transverse cross-section. The lip can also be formed by an outermost portion of the vertical outer wall being sloped outwardly, such as in the direction of the guide ramp 26 as will be described herein below.

Figure 3:
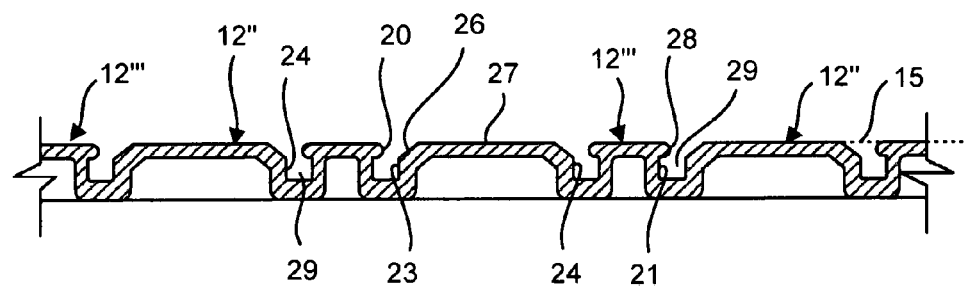
FIG. 3 is a further enlarged cross-section view along cross-section line 3-3 of FIG. 1.
Figure 6:
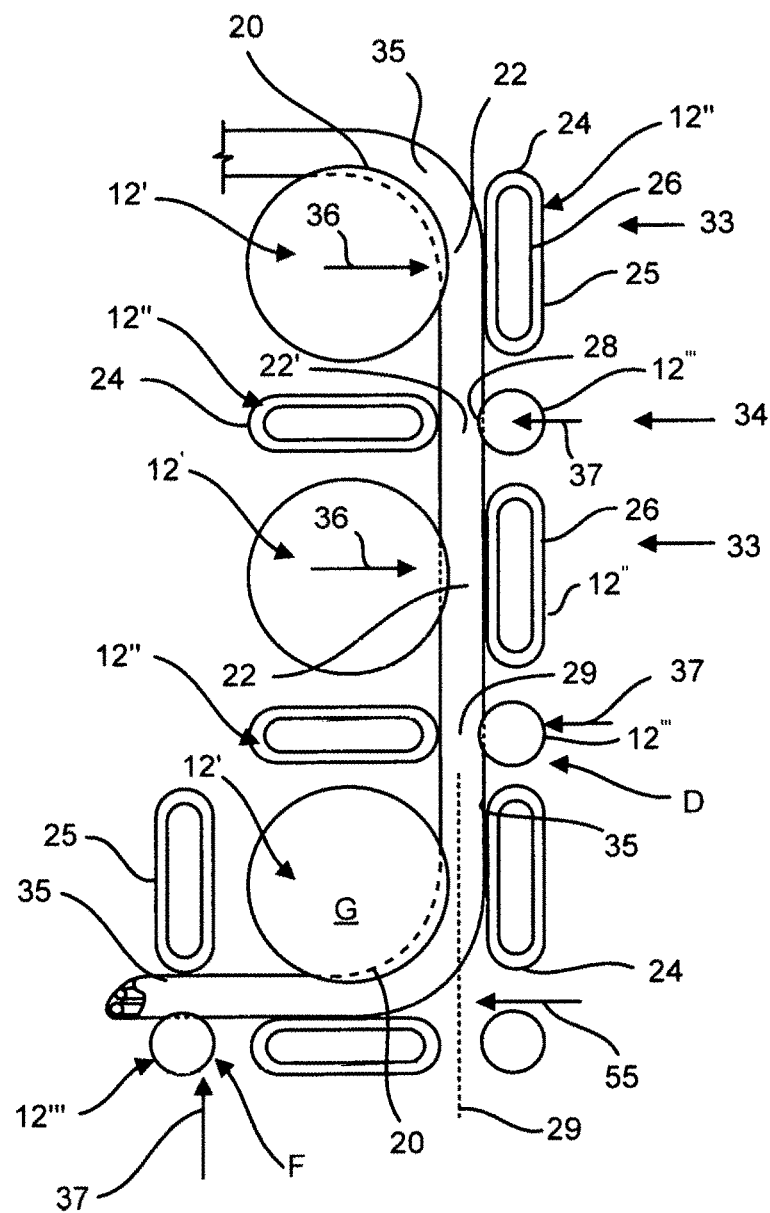
FIG. 6 is a top fragmented view showing the three different support formations and their relationship and positions relative to one another and their counter acting force, with respect to one another, to retain a heating wire captive in their respective anchoring passage.

A second of the support formations is in the form of a guide post 12" which is disposed on opposed transverse sides of the circular anchoring formation 12' and is spaced there from a predetermined common distance to form a first anchoring passage 22. As better seen from FIG. 5, the first anchoring passage 22 is defined between the straight vertical side wall 23 of the guide post 12" and the vertical outer wall 21 below the protruding lip 20 of the circular anchoring formation 12'. As shown in FIGS. 1, 3 and 6, the guide post 12" is formed has an elongated, substantially rectangular, guide post defining opposed outwardly curved end edges 24 and opposed parallel side edges 25. The length of the guide post 12" is equal to the diameter of the circular anchoring formation 12' and serves also as an abutment to a heating wire trained there against to maintain the wire along a straight path, see FIG. 6. A circumferential guide ramp 26 is defined in a top portion the straight vertical side wall 23 and merges to the flat top wall 27 in a direction slopping away from the circumferential protruding lip 20 whereby to form a side angulated entry opening 22' leading to the first anchoring passage 22, as better illustrated in FIG. 4-5, wherein to facilitate the positioning of a heating wire 35 into the first anchoring passage 22.

A third of the support formations is in the form of a circular anchoring post 12'''. The anchoring post 12''' is disposed spaced a predetermined common distance between the end edges 24 of opposed associated ones of four of the guide posts 12", as better seen in FIG. 1. The circular anchoring posts 12''' each have a circumferential protruding top edge forming an outwardly projecting lip 28, as does the circular anchoring formations 12', whereby to define second anchoring passages 29 between the circular anchoring posts 12''' and the end edges 24 of opposed associated ones of the four elongated rectangular guide posts 12" as identified in FIG. 1 by reference characters A, B, C, and D. As also illustrated in FIG. 1, the elongated rectangular guide posts 12" have a central longitudinal axis 30 thereof aligned with one another on transverse axes 31 and 31' of the repeat pattern throughout the base sheet 11. The circular anchoring posts 12''' have a center point 32 thereof lying at each intersection of the transverse axes 31 and 31'. The anchoring passages 22 and 29 have a predetermined width to receive a heating wire in close fit therein. In the embodiment described, and for a typical wire installation, the passages 22 and 29 have a width of about 0.15 inches whereby to receive in close friction fit therein a heating wire having an outer diameter of about 0.16 inches, has is common in the trade.

Figure 4:
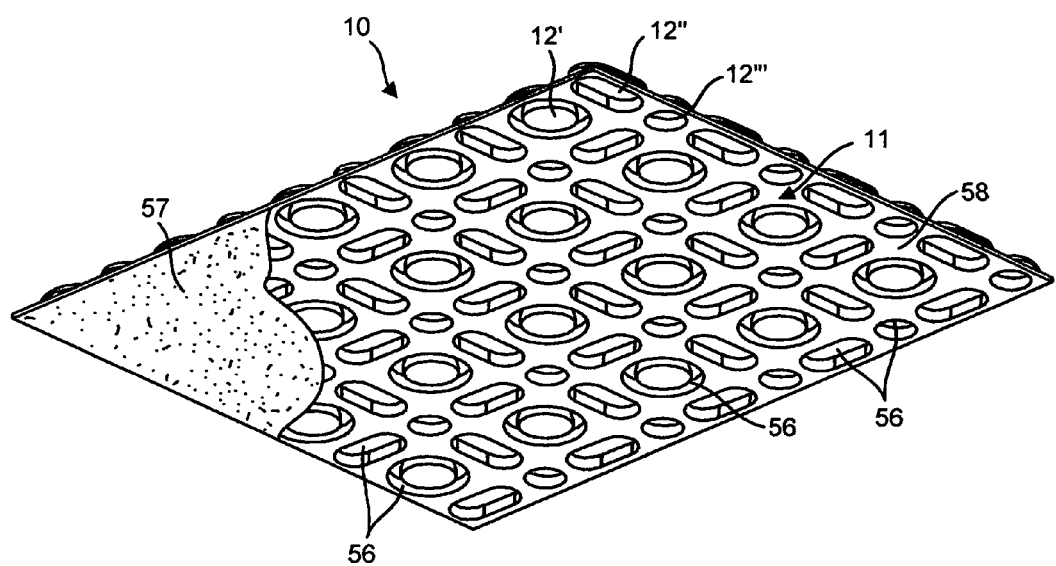
FIG. 4 is a bottom perspective view of the universal tile installation mat showing more details of the construction of the support platform and the cavities formed in the lower surface of the mat for decoupling and also illustrating in a fragmented portion of a liner material bonded to the bottom face of the mat.

As shown in FIG. 4, the first, second and third elevated formations 12', 12", and 12''', are hollow formations in at least portion thereof, to form air cavities or pockets 56 which are closed by a liner material 57, a portion of which is illustrated, and bonded to the bottom surface 58 of the base sheet 11 to trap air. These cavities or pocket permit flexing of the underlayment when loads are applied to it from above, such as when a person walks on a tiled floor surface or when there is movement in a sub-floor or wall whereby to decouple the mortar from the support surface of the underlayment 10 by permitting the underlayment to absorb the loads and displacements.

As shown in FIG. 6, a first anchoring passage 22 and a second anchoring passage 22' are disposed in alignment with one another on a common longitudinal axis 29 and in a continuing sequence whereby the beaded lip 20 projecting in the top edges of the circular anchoring posts 12''' and the circular anchoring formations 12' are alternately offset from one another, that is to say face in opposed directions in an alternate fashion. The reason for this is illustrated in FIG. 6 where it can be seen that their disposition creates opposed restraining forces against a heating wire 35, and on opposed sides of the wire in alternating sequence, trained along a path 29 between the alternating anchoring passages 22, 22',22, and so on. For example, the circular anchoring post 12''', at position 34, retains the heating wire 35 captive in its anchoring passage 22' under its beaded lip 28 between its outer side wall 21 and the vertical end wall 24 of the elongated guide post 12" and wherein a biasing planar retention force is created against the wire 35 under the lip 28 by the guide post 12' on opposed sides of the anchoring post 12''', as illustrated by arrow 36, acting against the displacement of the heating wire wanting to be displaced out of the side entrance opening 22' as shown in phantom lines 35 in FIG. 5. Likewise, opposed circular anchoring posts 12''' on opposed sides of a circular anchoring formation 12' create a planar retention force, as illustrated by arrows 37, to retain the wire under the lip of the formation 12' there between. Accordingly, the overhanging lips disposed offset in opposite spaced alternate direction over each side of the wire 35 prevent the wire 35 from popping out of the anchoring passages. These planar retention forces 37 and opposed restraining forces on the heating wire are created when the wire is exerted a force to pull out of the anchoring passages 22. Such forces on the heating wire can be caused by a person walking on the installation prior to the application of the thin set mortar or accidentally by the trade person engaging the heating wire by a trowel or any other accidental means. If portions of the heating wire becomes detached during the application of the mortar, the detached wire would create a bump in the mortar causing an uneven surface in which the ceramic tiles are set resulting in one or more floor tiles being set on a cantor exposing elevated side edges of the tile and making the floor uneven.

As also shown in FIG. 6, when the wire 35 is disposed for a right angle turn, such as shown at position 55, the circular anchoring posts 12''' at position "D" and "F", exert its planar pushing force, as shown by arrows 37 in the direction of corner circular anchoring formation 12' at position "G" to bias the wire 35 under the projecting lip 20 in the curved corner portion of the circular anchoring formation 12'. The tile installation mat of the present invention provides for heating wires to be trained along several patterns with runs extending along transverse axes. Wire runs can be formed extending at right angles around each of the first 12', the second 12", or the third 12''' support formations. Therefore, heating wires can be disposed with spacings of 2.25 inches when around two of the formations 12', 3.67 inches when around three of the formations 12''', and 3.08 inches when around two of the formations 12".

Because the elongated guide posts have a circumferential guide ramp 26, the installation of the wire into the passages is greatly facilitated by simply sliding the finger over, the wire aligned with the anchoring passages and the guide ramp of the rectangular guide post directs the wire sideways into the anchoring passages under the projecting lips of the circular anchoring formations 12' and alternate circular anchoring post 12'''.

With reference to FIG. 7 there is illustrated a typical installation of the tile installation mat in the construction of a floor where ceramic or natural stone tiles 40 are laid in a mortar base 43. The left side of FIG. 7 illustrates the use of the mat to decouple the mortar 43 and tiles 40 from the top surface 41 of a sub-floor herein constructed by a single plywood sheet 42. As herein shown, the liner material sheet 57, a non-woven fleece sheet, is bonded to the bottom surface of the base sheet and secured to the sub-floor 42 by glue 59. A grout 44 is also disposed and sets in the joints formed between the tiles 40 after the mortar has set. As can be seen the mortar or thin set cement 43 enters into the open top end cavities 16 of the circular anchoring formations 12' and lodges itself in the undercut formed by the inwardly slopping side walls 18. Also, the mortar will lodge itself in the anchoring passages 22 and 29, see FIGS. 2 and 3, and this is facilitated by the surrounding guide ramp 26 section of the side wall slopping about the elongated guide posts 12" and directing the concrete to enter the passages 22 and 29 through the side entry openings to be retained captive under the projecting lip formed in the top edges 20 and 28 of the respective anchoring passages 22 and 29. The left side of FIG. 7 illustrates the use of the same tile installation mat to perform the decoupling feature but as well it serves to anchor heating wires 35 in the anchoring passages 22 and 29 as above described with reference to FIG. 6.

Figure 8:
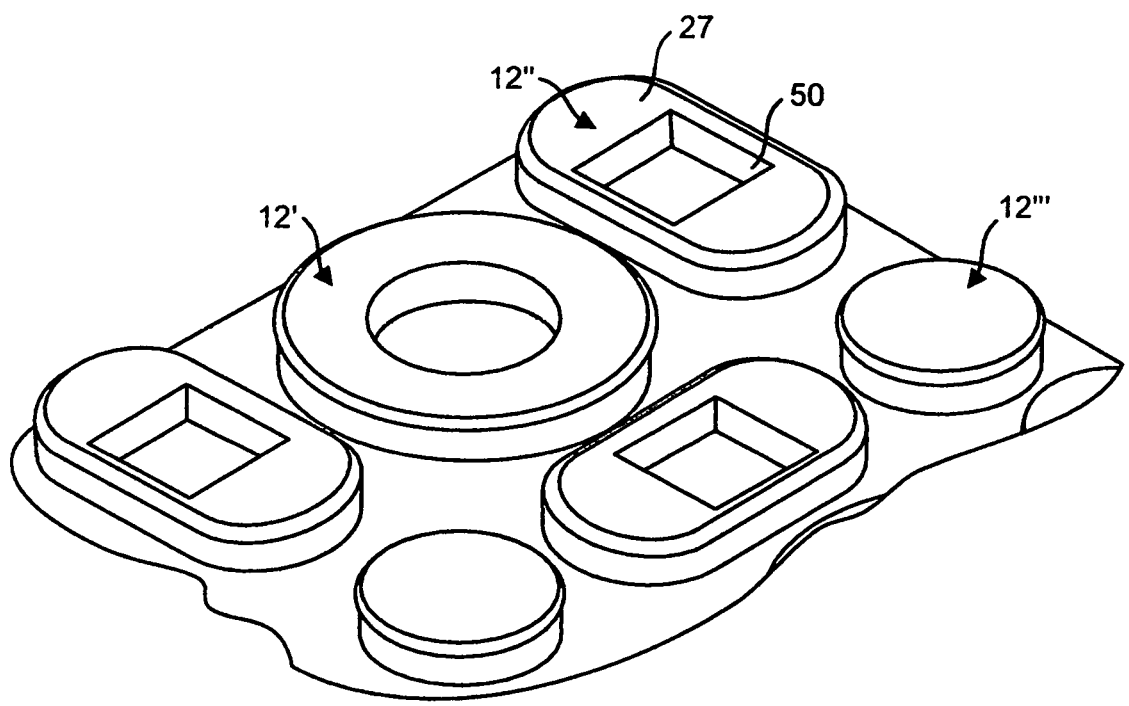
FIG. 8 is a fragmented perspective view illustrating a modification of the construction of the elongated rectangular shaped guide post.
Figure 9:
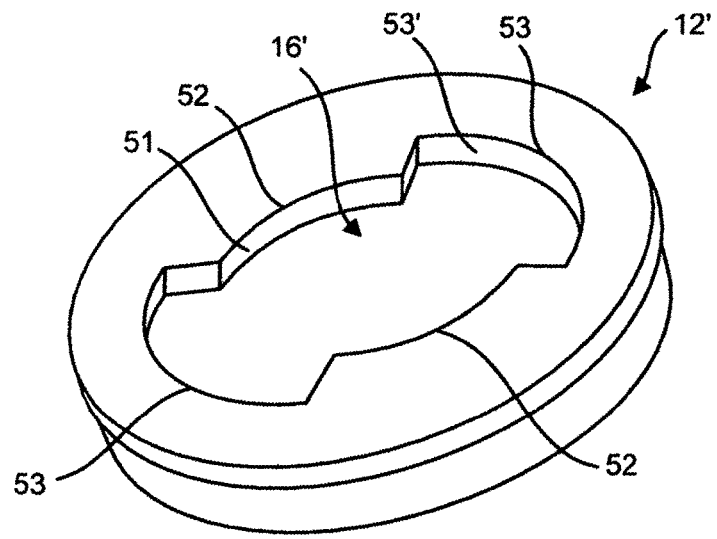
FIG. 9 is a further fragmented perspective view illustrating a modification of the construction of the mortar anchoring formation.

With reference to FIG. 8 there is illustrated a modification of the elongated rectangular guide post 12" and has herein shown a mortar anchoring cavity 50 is herein shown formed in the flat top wall 27 of the guide post. FIG. 9 illustrates a still further modification of the circular mortar anchoring formation 12' wherein the open top end cavity 16' is herein constituted by a surrounding inner side wall 51 having opposed side wall sections 52 formed has straight concavely shaped sections and opposed side wall sections 53 having inwardly inclined side wall sections 53' wherein mortar can lodge in the undercut formed by the inwardly inclined side wall sections.

The word "universal" has used herein is intended to mean that the same tile installation mat can be used to serve two distinct functions, as described herein above, as opposed to prior art underlayments where a separate underlayment is required for each of the two functions.

It is within the ambit of the present invention to cover any obvious modification to the examples of the preferred embodiment described herein, provided such modifications fall within the scope of the appended claims.

The invention claimed is:

1. A universal tile installation mat for use on a sub-floor or wall surface to anchor a mortar adapted to receive in support engagement floor or wall tiles and wherein said tile installation mat uncouples the mortar and floor or wall tiles set therein from said sub-floor or wall surface, said tile installation mat comprising a flexible base sheet having integrally formed a plurality of elevated support formations projecting outwardly from a flat outer surface of said base sheet and terminating in a flat top surface lying in a common flat plane substantially parallel to said flat outer surface of said base sheet, there being three different elevated support formations, said support formations being disposed in a repeat pattern throughout said base sheet, one of said elevated support formations being circular mortar anchoring formations each defining an open top end cavity in said flat top wall and having at least a portion of an inner side wall of the cavity sloping downwardly and inwards under said flat top surface to a base wall of said open top end cavity, said circular mortar anchoring formations further defining an outer a circumferential protruding top edge, a second of said elevated formations being guide posts disposed on opposed transverse sides of at least some of said circular mortar anchoring formations and spaced therefrom a predetermined common distance to define a first anchoring passage between a straight vertical side wall of said guide posts and a bottom outer wall portion of said circular mortar anchoring formations under said outer circumferential protruding top edge, and wherein a third of said elevated support formations are circular anchoring posts having an outwardly projecting lip at a top end thereof, said circular anchoring posts being disposed and spaced said predetermined common distance between end edges of opposed associated ones of four of said guide posts to define a second anchoring passage between said straight vertical side wall of said guide posts and a bottom outer wall portion of said circular anchoring posts under its outwardly projecting lip, said first and second anchoring passages being aligned with one another with said circumferential protruding top edge of said circular mortar anchoring formation and said outwardly protruding lip of said circular anchoring post disposed on opposite sides of said first and second aligned anchoring passages to provide opposed offset restrainment against a heating wire disposed in said anchoring passages.

2. The universal tile installation mat as defined in claim 1 wherein said guide posts each have a circumferential guide ramp defined in a top portion of said straight vertical side wall, said guide ramp being defined by a rearwardly sloped top side wall portion merging to a flat top wall of said guide post away from said circumferential protruding top edge of adjacent ones of said circular mortar anchoring formations and said outwardly projecting lip of said circular anchoring posts.

3. The universal tile installation mat as defined in claim 2 wherein said first and second anchoring passages are also mortar anchoring passages, said guide ramp of said guide posts guiding said mortar into said mortar anchoring passage.

4. The universal tile installation mat as defined in claim 2 wherein said guide ramp of each said guide posts is sloped to guide guiding a portion of a heating wire trained pressed between some of said support formations into said wire anchoring passage.

5. The universal tile installation mat as defined in claim 2 wherein said guide posts are elongated, substantially rectangular, guide posts having outwardly curved end edges.

6. The universal tile installation mat as claimed in claim 5 wherein said elongated rectangular guide posts are disposed on parallel spaced transverse axes and have a central longitudinal axis thereof aligned with one another and selected ones of said spaced transverse axes throughout said base sheet, said circular anchoring posts having its center point lying at an intersection of said transverse axes.

7. The universal tile installation mat as claimed in claim 5 wherein said circumferential protruding top edge of said circular mortar anchoring formations form a circumferential beaded lip projecting beyond said bottom outer wall portion of said mortar anchoring formation, said bottom outer wall portion being a straight vertical wall disposed parallel to said straight vertical side wall of said guide post, said circumferential guide ramp providing guided side entry into said second anchoring passage.

8. The universal tile installation mat as claimed in claim 7 wherein said anchoring passage has a width calculated to receive a wire captive therein in close fit engagement under said beaded lip.

9. The universal tile installation mat as claimed in claim 8 wherein said wire is a heating wire trained in a pattern of straight wire runs disposed on transverse axes about some of said elevated support formations to form a heated floor.

10. The universal tile installation mat as claimed in claim 6 wherein said offset disposition of said outer circumferential protruding top edge of said mortar anchoring formations and the position of said rectangular guide post in said repeat pattern create opposed restraining forces on a heating wire trained between adjacent first and second anchoring passages, which form a right angle wire bend, when said heating wire is forced outwards whereby to maintain said heating wire in said anchoring passages under said protruding top edges of said circular anchoring posts and said circular anchoring posts.

11. The universal tile installation mat as claimed in claim 5 wherein said elongated, substantially rectangular, guide posts have a cavity formed in a flat top wall thereof with at least a portion of a side wall of said cavity sloping slightly under said flat top wall thereof.

12. The universal tile installation mat as claimed in claim 1 wherein said open top end cavity of said mortar anchoring formations is a rectangular cavity provided with opposed straight side walls, at least some of said opposed side walls sloping downwardly inwards.

13. The universal tile installation mat as claimed in claim 1 wherein said universal tile installation mat is formed from a suitable flexible plastics material and has a total thickness of about 5 millimeters as calculated from an underface of said base sheet to said flat top wall of said support formations.

14. The universal tile installation mat as claimed in claim 6 wherein said transverse axes of said rectangular guide posts intersect said circular anchoring posts on a common axis disposed on opposed transverse sides of said circular mortar anchoring formations to facilitate the formation of a roll of said universal tile installation mat.

15. The universal tile installation mat as claimed in claim 1 wherein a liner material is bonded to a bottom surface of said base sheet.

16. The universal tile installation mat as claimed in claim 15 wherein said plurality of elevated support formations are hollow formations in at least portions thereof to form air pockets there under for uncoupling said mortar and floor or wall tiles set therein from said sub-floor surface or wall surface.

17. The universal tile installation mat as claimed in claim 1 wherein said guide posts are elongated guide posts having a length equal to the diameter of said circular mortar anchoring formations and provide an abutment along an elongated side wall thereof to maintain a heating wire, captive between a plurality of said anchoring passages, extending in a straight path.

18. An underlayment to uncouple mortar having floor or wall tiles set therein from a sub-floor or wall surface, said underlayment comprising a flexible base sheet having integrally formed therein a plurality of elevated support formations projecting outwardly from a flat outer surface of said base sheet; said support formations being disposed and spaced apart a predetermined common distance in a repeat pattern throughout said base sheet, some of said support formations being mortar anchoring formation and guide post formations, said guide post formations having a vertical wall facing said mortar anchoring formations, said mortar anchoring formations having a protruding lip in at least a circumferential outer portion thereof to form a heating wire anchoring passage thereunder with at least a portion of said vertical wall of an adjacent one of said guide post formations, said guide post formations being disposed on opposed transverse sides of at least some of said mortar anchoring formations, said protruding lip of said mortar anchoring formation and said vertical wall on adjacent two of said guide post formations defining transverse wire anchoring passages to cause a heating wire to be disposed to form a right angle bend with a side of said heating wire disposed under a portion of said protruding lip of said mortar anchoring formation, said heating wire being retained and engaged under said portion of said protruding lip of said mortar anchoring formation by protruding lips of further anchoring formations disposed on an opposed side of said heating wire along each of said transverse wire anchoring passages and immediately spaced from a respective one of said adjacent two of said guide post formations to provide opposed offset restrainment against said heating wire right angle bend having said side thereof disposed under said portion of said protruding lip of said mortar anchoring formation.

19. The underlayment as claimed claim 18 wherein said plurality of elevated support formations have an upper end terminating in a flat top surface lying in a common flat plane substantially parallel to said flat outer surface of said base sheet, and further wherein said anchoring post formations are disposed said predetermined common distance between end edges of opposed associated ones of four of said guide post formations.

20. The underlayment as claimed in claim 18 wherein said guide post formations each have a circumferential guide ramp defined in a top portion of said vertical wall thereof and merging to a flat top wall away from said protruding lip of said mortar anchoring formations to facilitate positioning of said wire under said protruding lip of said mortar anchoring formations.

21. A method of restraining an electrical heating wire in a top surface of an underlayment, said method comprising the steps of:
  (i) forming said underlayment from a flexible sheet material having repeat patterns of anchoring formations projecting outwardly from a flat outer surface of said flexible sheet material, said anchoring formations being constituted by mortar anchoring formations and guide post formations, said guide post formations having a vertical wall facing a first mortar anchoring formations and disposed a predetermined common distance on transverse sides of said mortar anchoring formations, said mortar anchoring formations having a protruding lip in at least an outer circumferential outer portion thereof to form transverse heating wire anchoring passages thereunder with at least a portion of a vertical wall of adjacent ones of said guide post formations on transverse sides of said mortar anchoring formations;
  (ii) pressing an electrical heating wire in selected ones of said transverse wire passages to form straight wire runs and right angle wire bends with said wire being guided under said protruding lip of said first mortar anchoring formations and said second mortar anchoring formations and against said associated vertical wall of said guide post formations, said protruding lip of said first and second adjacent mortar anchoring formations and the vertical wall of said associated one of said guide post formations along said straight wire runs providing opposed and spaced offset restrainment against said electrical heating wire from being displaced out from under said protruding lip of alternate ones of said mortar anchoring formations and guide post formations to retain said wire in said selected ones of said transverse wire passages, said electrical heating wire guided under said projecting lip of a mortar anchoring formation forming one of said right angle wire bends being restrained thereunder by said protruding lip of said further mortar anchoring formations disposed immediately adjacent said heating wire right angle bend on respective ones of transverse heating wire anchoring passages intersecting at said right angle wire bends.

22. The method of claim 21 wherein said guide post formations each have a circumferential guide ramp defined in a top portion of said straight vertical side wall with said guide ramp merging inwards to a flat top wall of said guide post away from said circumferential protruding top edge, said step (ii) comprising pressing said heating wire against said guide ramp of said guide posts adjacent said protruding lip of said first and second mortar anchoring formations and said anchoring post formations to guide said wire into said anchoring passages under said protruding lips.

\* \* \* \* \*